(12) United States Patent
Li et al.

(10) Patent No.: US 8,514,922 B2
(45) Date of Patent: Aug. 20, 2013

(54) FILTER COEFFICIENT CONTROL APPARATUS AND METHOD

(75) Inventors: Lei Li, Beijing (CN); Zhenning Tao, Beijing (CN); Ling Liu, Beijing (CN); Shoichiro Oda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/835,214

(22) Filed: Jul. 13, 2010

(65) Prior Publication Data

US 2011/0064169 A1 Mar. 17, 2011

Related U.S. Application Data

(63) Continuation of application No. PCT/CN2009/072027, filed on May 27, 2009.

(51) Int. Cl.
*H03H 7/30* (2006.01)

(52) U.S. Cl.
USPC .......... 375/229; 375/230; 375/254; 375/296; 375/343; 375/350; 375/373

(58) Field of Classification Search
USPC ................. 375/229, 230, 254, 296, 343, 350, 375/373
See application file for complete search history.

(56) References Cited

U.S. PATENT DOCUMENTS

2009/0180368 A1* 7/2009 Miyashita et al. ......... 369/53.35

* cited by examiner

*Primary Examiner* — Kabir A Timory
(74) *Attorney, Agent, or Firm* — Staas & Halsey LLP (57) ABSTRACT

This invention relates to an apparatus and a method for controlling a filter coefficient. The filter coefficient control apparatus controls a coefficient of a filter of a phase recovering apparatus, and comprises a phase offset obtaining means, for obtaining a phase offset between a carrier and a local oscillation; an autocorrelation calculating means, for calculating an autocorrelation and related statistics of the phase offset; and a filter coefficient determining means, for determining the coefficient of the filter in accordance with the autocorrelation and related statistics.

9 Claims, 12 Drawing Sheets

FILTER COEFFICIENT CONTROL APPARATUS AND METHOD

CROSS REFERENCE TO RELATED APPLICATIONS

This is a continuing application, filed under 35 U.S.C. §111(a), of International Application PCT/CN2009/072027, filed May 27, 2009, the contents of which are incorporated herein by reference.

FIELD OF THE INVENTION

The present invention relates to optical communications, and more particularly to optical coherent receivers.

BACKGROUND OF THE RELATED ART

With the increasing demand on the performance of capacity and flexibility of the optical communications system, the coherent optical communication technology has become more and more important. In comparison with incoherent technology (such as on-off key, OOK) or auto-coherent technology (such as differential quadrature phase shift keying, DQPSK), the coherent technology has the following advantages: 3 dB of optical signal-to-noise ratio (OSNR) gain; capability to use more efficient modulation technologies (such as quadrature modulation QAM) to enhance transmission capacity; and convenient use of electric equalization technology to respond to channel variations, and to lower the production cost, etc. Like the case in electric coherent technology, it is also necessary for an optical coherent receiver to recover carrier phase. Currently, carrier phase recovery in the optical coherent receiver is generally achieved via digital technology. For instance, in "Coherent detection of optical quadrature phase-shift keying signals with carrier phase estimation", (Journal of Lightwave Technology, Vol. 24, No. 1, January 2006, pp 12-21), D. Ly-Gagon et al. propose a method based on $M^{th}$ power, and in "Multiplier-free Phase Recovery for Optical Coherent Receivers" (OWT4, OFC2008), Z. Tao et al. propose a method based on data predetermination, etc. Due to the presence of optical noises in channels and electric noises in the receiver, it is necessary for the digital phase recovery technology to filter the received signal to remove the influence of the noises so as to obtain the precise carrier phase. Thus, performance of phase recovery is closely related to parameter selection of the filter. As well known, optimization of parameters of the filter should be directed to the noises and the filtered signal (optical carrier phase in this context). However, variation of the optical carrier phase is decided by many factors (such as laser characteristics in the transmitter/receiver, configuration of fiber channels and signal powers of adjacent channels) in an actual transmission system. These factors are not invariant and difficult to be obtained by real-time detection.

Figure 1:
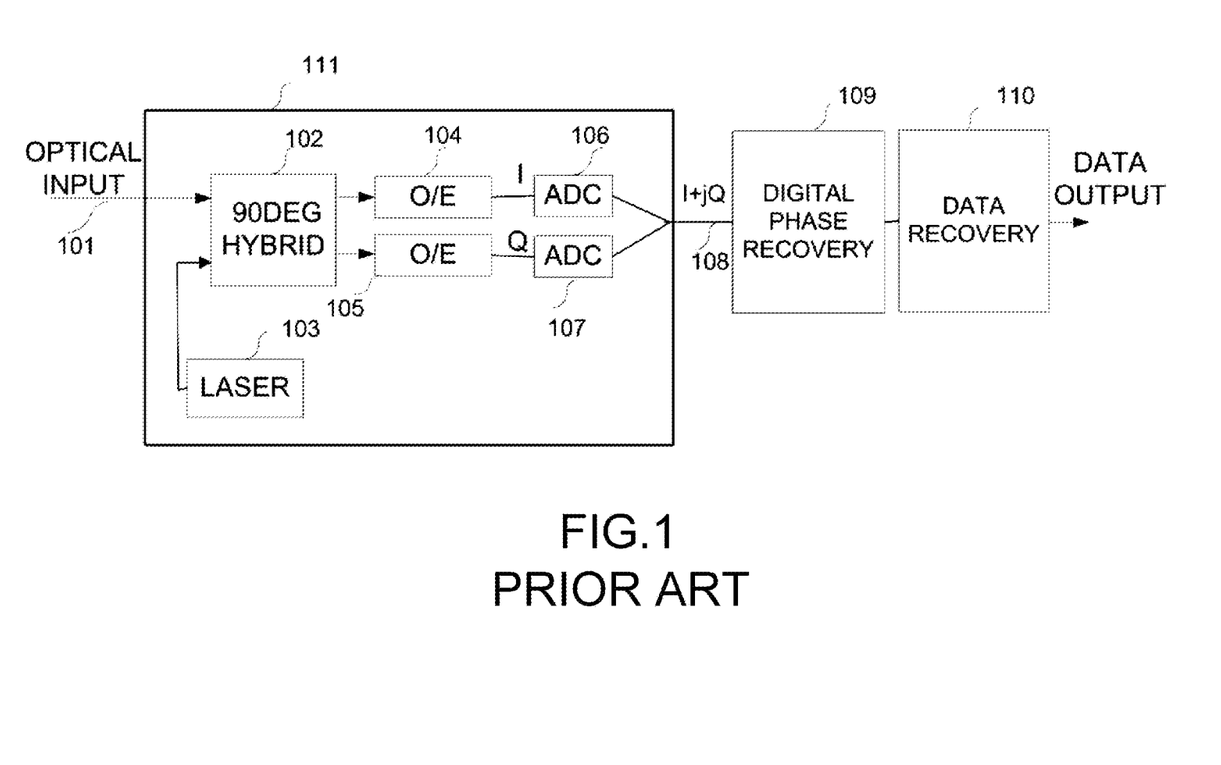
FIG. 1 schematically shows a prior art optical coherent receiver that makes use of a digital phase recovering apparatus.

FIG. 1 shows a prior art optical coherent receiver that makes use of a digital phase recovering apparatus. In FIG. 1, the optical 90° frequency mixer 102, photoelectric converters (O/E) 104 and 105, analog-to-digital converters (ADC) 106 and 107, and laser 103 compose the front end 111 of the optical coherent receiver. The function of this section is to convert the received optical input signal 101 into a baseband electric signal 108. The baseband electric signal 108 can be expressed as $I+jQ=\exp(j\phi_d+j\phi_0)+n$, where n indicates noise. In general circumstances, the baseband electric signal 108 not only contains data information $\phi_d$, but also contains phase offset $\phi_0$ between carrier and local oscillation (laser 103).

Function of the digital phase recovering apparatus 109 is to remove the phase offset $\phi_0$ in the baseband electric signal 108. Output from the digital phase recovering apparatus 109 is the data information $\phi_d$, and the data recovery device 110 recovers the transmitted data in accordance with the input data information. As can be seen from the above, the digital phase recovering apparatus 109 is a very important part in the optical coherent receiver.

Figure 2:
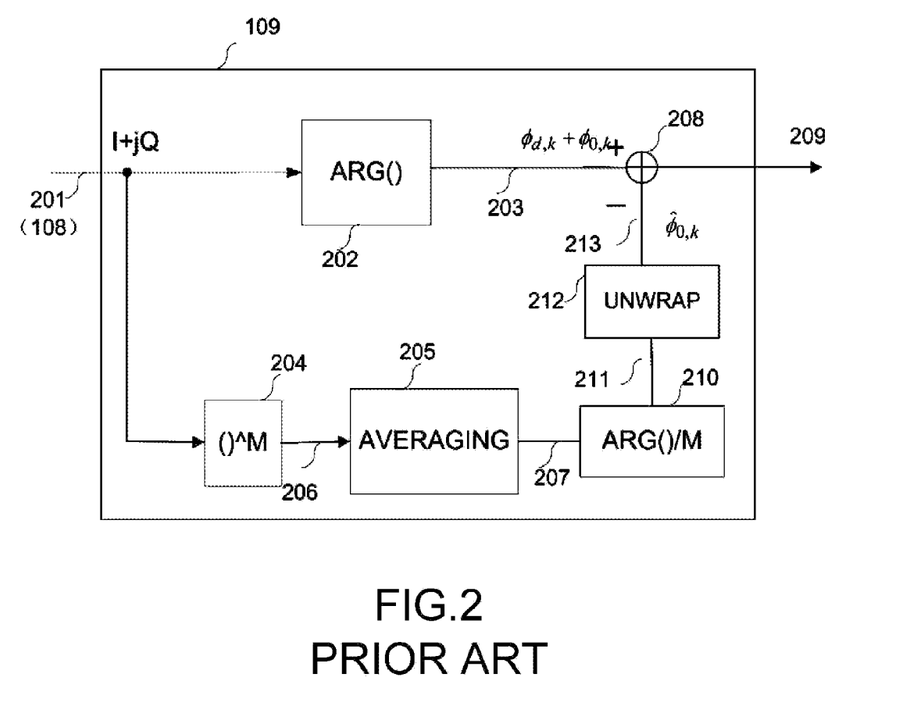
FIG. 2 schematically shows a prior art digital phase recovering apparatus.

The prior art digital phase recovering apparatus can be represented by the structure as shown in FIG. 2. The data removal modulator 204 performs $M^{th}$ power calculation on the input digital baseband electric signal 201 (108) to remove data phase modulation (where M is the order of the digital phase modulation, for example, M=4 with respect to QPSK), so as to obtain a demodulated signal 206, namely $\exp(jM\phi_0)+n^*$, where $n^*$ indicates the noise after $M^{th}$ power calculation. In general circumstances, variation of the phase offset is slower than variation of the noise. Consequently, it is possible to use an averager 205 to remove the influence of the noise. The argument calculator 210 obtains a value 211 of the phase offset in the range $[-\pi/M, \pi/M]$ on base of the output 207 of the averager 205, the unwrapper 212 unwraps the value 211 as a value in the range $[-\pi, \pi]$, this value is the estimated value $\hat{\phi}_0$ of the phase offset, and the subtracter 208 finally subtracts the estimated value $\hat{\phi}_0$ of the phase offset from the symbol phase obtained by the argument calculator 202 to thereby obtain the signal 209 whose phase has been recovered.

As can be seen from the above, working performance of the phase recovering apparatus is mainly dependent upon the design of the averager. The averager 205 can perform arithmetic averaging in segments, and can also perform sliding averaging. There are currently some methods that adaptively adjust the length as used by the averaging to optimize the performance of phase recovery, for instance, "Adaptive optimization for digital carrier phase estimation in optical coherent receivers", pages 121-122, 2008 Digest of the IEEE/LEOS Summer Topical Meetings.

However, in the process of researching on the present invention the inventor of the present application has found that such optimization is directed only to the adjustment of the length used in the averaging, while it does not involve the relative relationship of phase offset on each symbol within the length. Accordingly, the optimal performance cannot be obtained by such optimization.

A technique is therefore currently needed to adaptively optimize the filter coefficient in digital phase recovery, so that the digital phase recovering apparatus of the optical coherent receiver operates at the best status.

SUMMARY OF THE INVENTION

Embodiments of the present invention are proposed in view of the aforementioned problems and limitations in the prior art, to solve one or more problems existed in the prior art, and to at least provide an advantageous choice.

To achieve the above objectives, the following aspects are provided in the embodiments according to the present invention.

Aspect 1: A filter coefficient control apparatus, for controlling a coefficient of a filter of a phase recovering apparatus, including: a phase offset obtaining means, for obtaining a phase offset between a carrier and a local oscillation; an autocorrelation calculating means, for calculating an autocorrelation and related statistics of the phase offset; and a filter coefficient determining means, for determining the coefficient of the filter in accordance with the autocorrelation and related statistics.

Aspect 2: The filter coefficient control apparatus according to Aspect 1, wherein the phase offset obtaining means is a subtracter that subtracts a data modulation phase of each symbol in a training sequence input into the phase recovering apparatus from an argument value of each symbol in the training sequence to obtain the phase offset.

Aspect 3: The filter coefficient control apparatus according to Aspect 1, wherein the phase offset obtaining means includes a subtracter and a data modulation phase obtaining unit; the data modulation phase obtaining unit obtains a data modulation phase of each symbol of an output signal from the phase recovering apparatus, or obtains a data modulation phase of each symbol in a decoded signal obtained by decoding the output signal; and the subtracter subtracts the data modulation phase from an argument value of each symbol in a signal input into the phase recovering apparatus to obtain the phase offset.

Aspect 4: The filter coefficient control apparatus according to Aspect 3, wherein the data modulation phase obtaining unit obtains a data modulation phase of each symbol in an output signal from the phase recovering apparatus, and includes: a $2\pi/M$ rounder, for performing $2\pi/M$ rounding on the output signal; a multiplier, for multiplying an integer value obtained by the $2\pi/M$ rounder with $2\pi/M$; and an adder, for adding a product obtained by the multiplier with $\pi/M$.

Aspect 5: The filter coefficient control apparatus according to Aspect 3, wherein the data modulation phase obtaining unit obtains a data modulation phase of each symbol in a decoded signal obtained by decoding the input signal, and includes: a multiplier, for multiplying the decoded signal with $2\pi/M$; and an adder, for adding a product obtained by the multiplier with $\pi/M$.

Aspect 6: The filter coefficient control apparatus according to Aspect 1, wherein the autocorrelation calculating means includes: a delay sequence obtaining unit, for obtaining a delay sequence by differently delaying the phase offset; and an autocorrelation sequence obtaining unit, for determining the autocorrelation and related statistics of the phase offset in accordance with the delay sequence.

Aspect 7: The filter coefficient control apparatus according to Aspect 1, wherein the autocorrelation calculating means includes: a delay sequence obtaining unit, for obtaining a delay sequence by differently delaying the phase offset; a noise suppressing unit, for suppressing noise in the delay sequence; and an autocorrelation sequence obtaining unit, for determining the autocorrelation and related statistics of the phase offset of the filter coefficient in accordance with the delay sequence having been removed of noise.

Aspect 8: The filter coefficient control apparatus according to Aspect 1, wherein the filter coefficient determining means includes: an input/output cross-correlation determining unit, for determining cross-correlation between an input and an ideal output of the filter; an input autocorrelation unit, for determining autocorrelation of the input of the filter; and a coefficient calculating unit, for determining the filter coefficient in accordance with the cross-correlation and the autocorrelation.

Aspect 9: The filter coefficient control apparatus according to Aspect 8, wherein the autocorrelation and related statistics is a variance $\sigma_n^2$, of phase fluctuation caused by channel white noise, a variance $\sigma_c^2$ of change of the phase offset, and a normalized autocorrelation $\rho(k)$ of the phase offset; the input/output cross-correlation determining unit determines the cross-correlation $R(k)$ between the input and the ideal output of the filter in accordance with the following equation (where M is an order of phase modulation of the transmitted data, for instance, when the transmitted data is QPSK modulation, M=4):
$R(k)=\exp\{M^2\sigma_c^2[\rho(k)-1]\}$; and the input autocorrelation unit determines the autocorrelation $R'(k)$ of the input of the optimal filter in accordance with the following equation:
$R'(k)=\exp\{M^2\sigma_c^2[\rho(k)-1]\}+M^2\sigma_n^2\delta(k)$, where $\delta(k)$ is an impulse function, and the value of $\delta(k)$ is 1 if the k is 0 and the value of $\delta(k)$ is 0 if k is a value other than 0, and where k is an integer and $-M<k<M$.

Aspect 10: A method for controlling a filter coefficient, for controlling a coefficient of a filter of a phase recovering apparatus, including: obtaining a phase offset between a carrier and a local oscillation; calculating an autocorrelation and related statistics of the phase offset; and determining the coefficient of the filter in accordance with the autocorrelation and related statistics.

Aspect 11: The method for controlling a filter coefficient according to Aspect 10, wherein the obtaining subtracts a data modulation phase of each symbol in a training sequence input into the phase recovering apparatus from an argument value of each symbol in the training sequence to obtain the phase offset.

Aspect 12: The method for controlling a filter coefficient according to Aspect 10, wherein the obtaining includes obtaining a data modulation phase of each symbol of an output signal from the phase recovering apparatus, or obtaining a data modulation phase of each symbol in a decoded signal obtained by decoding the output signal; and subtracting the data modulation phase from an argument value of each symbol in a signal input into the phase recovering apparatus to obtain the phase offset.

Aspect 13: The method for controlling a filter coefficient according to Aspect 12, wherein the obtaining includes: performing $2\pi/M$ rounding on the output signal or the decoded signal; multiplying an integer value obtained by the $2\pi/M$ rounding with $2\pi/M$; and adding a product obtained by the multiplying with $\pi/M$.

Aspect 14: The method for controlling a filter coefficient according to Aspect 10, wherein the calculating includes: obtaining a delay sequence by differently delaying the phase offset; and determining the autocorrelation and related statistics of the phase offset in accordance with the delay sequence.

Aspect 15: The method for controlling a filter coefficient according to Aspect 10, wherein the calculating includes: obtaining a delay sequence by differently delaying the phase offset; removing noise in the delay sequence; and determining the autocorrelation and related statistics of the phase offset in accordance with the delay sequence having been removed of noise.

Aspect 16: The method for controlling a filter coefficient according to Aspect 10, wherein the determining includes: determining cross-correlation between an input and an ideal output of the filter; determining autocorrelation of the input of the filter; and determining the coefficient of the optimal filter.

Aspect 17: The method for controlling a filter coefficient according to Aspect 16, wherein the autocorrelation and related statistics is a variance $\sigma_n^2$, of phase fluctuation caused by channel white noise, a variance $\sigma_c^2$ of change of the phase offset, and a normalized autocorrelation $\rho(k)$ of the phase offset; the cross-correlation $R(k)$ between the input and the ideal output of the filter is determined in accordance with the following equation:
$R(k)=\exp\{M^2\sigma_c^2[\rho(k)-1]\}$; and the autocorrelation $R'(k)$ of the input of the optimal filter is determined in accordance with the following equation:

$R'(k)=\exp\{M^2\sigma_c^2[\rho(k)-1]\}M^2\sigma_n^2\delta(k)$, where $\delta(k)$ is an impulse function, and the value of $\delta(k)$ is 1 if the k is 0 and the value of $\delta(k)$ is 0 if k is a value other than 0, and where k is an integer and $-M<k<M$.

Aspect 18: A phase recovering apparatus, including the filter coefficient control apparatus according to any one of Aspects 1-9.

Aspect 19: The phase recovering apparatus according to Aspect 18, wherein the phase recovering apparatus includes a data removal modulator, a normalizer and an adjustable filter connected in series to one another, and the filter coefficient control apparatus controls the filter coefficient of the adjustable filter.

Aspect 20: A digital receiver, including the phase recovering apparatus according to Aspect 18.

The method according to the embodiments of the present invention does not require a priori knowledge such as channel and/or laser characteristics, and is capable of achieving adaptive optimization with variation of channel characteristics to obtain the best receiving performance.

With reference to the following description and the accompanying drawings, these and other aspects and features of the present invention will become apparent. Specific embodiments of the present invention are disclosed in detail in the following description and the accompanying drawings, and the modes applicable to the principles of the present invention are enunciated. As should be understood, the present invention is not restricted in scope thereby, as the present invention includes many variations, modifications and analogs within the scope of the spirits and provisos of the attached claims.

Features described and/or illustrated with respect to one embodiment are applicable to one or more other embodiments in identical or similar mode, are combinable with features in other embodiments, or replace features in other embodiments.

As should be stressed, the term of "including/comprising" when used in this document indicates existence of features, integral parts, steps or component parts, but does not exclude the existence or addition of one or more other features, integral parts, steps or component parts.

SPECIFIC EMBODIMENTS FOR CARRYING OUT THE INVENTION

The digital phase recovering apparatus according to the embodiments of the present invention is described in greater detail below with reference to the accompanying drawings.

Basic working principle of the embodiments according to the present invention is to obtain statistical characteristics of the phase offset from a received signal, and to adaptively adjust the digital phase recovering apparatus in accordance with the statistical characteristics of the phase offset to ensure optimal receiving performance.

Figure 3:
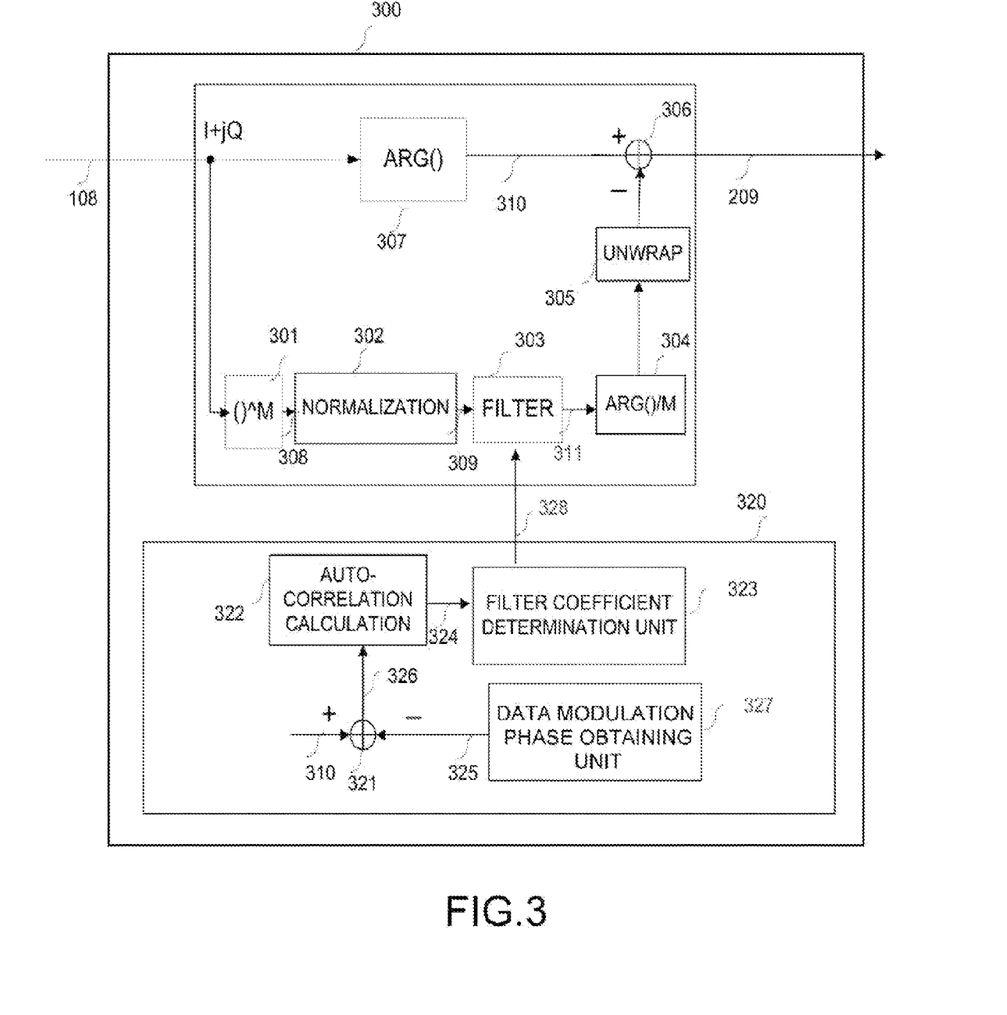
FIG. 3 is a functional block diagram schematically showing a phase recovering apparatus according to an embodiment of the present invention.

FIG. 3 is a functional block diagram schematically showing the phase recovering apparatus according to an embodiment of the present invention. As shown in FIG. 3, the apparatus is divided into two sections. The first section is a controlled section (phase recovering section), and this section carries out the same function as that of the conventional digital phase recovering apparatus as shown in FIG. 2, wherein the data removal modulator 301 corresponds to the data removal modulator 204 in FIG. 2, the argument calculator 307 corresponds to the argument calculator 202 in FIG. 2, the subtracter 306 corresponds to the subtracter 208 in FIG. 2, the argument calculator 304 corresponds to the argument calculator 210 in FIG. 2, and the unwrapper 305 corresponds to the unwrapper 212 in FIG. 2. Signals 308, 310 and 311 respectively correspond to the signals 206, 203 and 207 in FIG. 2. In comparison with FIG. 2, the phase recovering section in the embodiment of the present invention as shown in FIG. 3 is added with a normalizer 302 after the data removal modulator 301, and the averager 205 is realized as an adjustable filter 303. The adjustable filter 303 is connected, via a control port, to the second section (namely the filter coefficient control apparatus 320) of the phase recovering apparatus according to the embodiment of the present invention.

As shown in FIG. 3, the filter coefficient control apparatus 320 comprises a subtracter 321, an autocorrelation calculator 322 and a filter coefficient calculating unit 323. Moreover, in certain embodiments, a data modulation phase obtaining unit 327 can be further included.

The subtracter 321 obtains the phase offset between carrier and local oscillation, and is an example of the phase offset obtaining means according to the embodiment of the present invention. One input to the subtracter 321 is the phase of a received symbol, namely the output 310 of the argument calculator 307 of the phase recovering section. Another input 325 to the subtracter 321 is the data modulation phase of the received symbol. Based on whether the receiver has known the data modulation phase of the symbol, the data modulation phase obtaining unit 327 obtains the data modulation phase of the received symbol in two circumstances. In one circumstance in which the receiver has known the data modulation phase of the symbol, for instance in the case there is a training sequence in the system, the receiver definitely knows the data modulation phase of each symbol in the training sequence in accordance with pre-specification or agreement. In this case a dedicated data modulation phase obtaining unit is not required. In the second circumstance in which the receiver does not know the data modulation phase of the symbol, it is possible to obtain the input 325 by deciding the received symbol. For instance, the data modulation phase obtained by performing data deciding on the output 209 of the phase recovering apparatus 300 is taken as the input 325, or alternatively, the input 325 is obtained in accordance with the decoded data output from the final receiver. Since the deciding and decoding are always done in the receiver, obtaining the input 325 of the subtracter 329 in this way does not increase the processing load of the receiver.

The input to the autocorrelation calculator 322 is the output from the subtracter 321, and is the phase offset with channel additive white noise on each symbol. The autocorrelation calculator 322 according to the embodiment of the present invention can for example be realized by the XPM Monitor in "A Linear Model for Nonlinear Phase Noise Induced by Cross-phase Modulation" (paper OTuD5, OFC2009). The output signal 324 thereof is a variance $\sigma_n^2$ of phase fluctuation caused by channel white noise, a variance $\sigma_c^2$ of change of the phase offset (change of the phase offset might be caused by such factors as phase noise of the laser and cross phase modulation between channels), and a normalized autocorrelation $\rho(k)$ of the phase offset. $\rho(k)$ is a vector of 1×2M, where k is an integer and $-M<k<M$.

Figure 4:
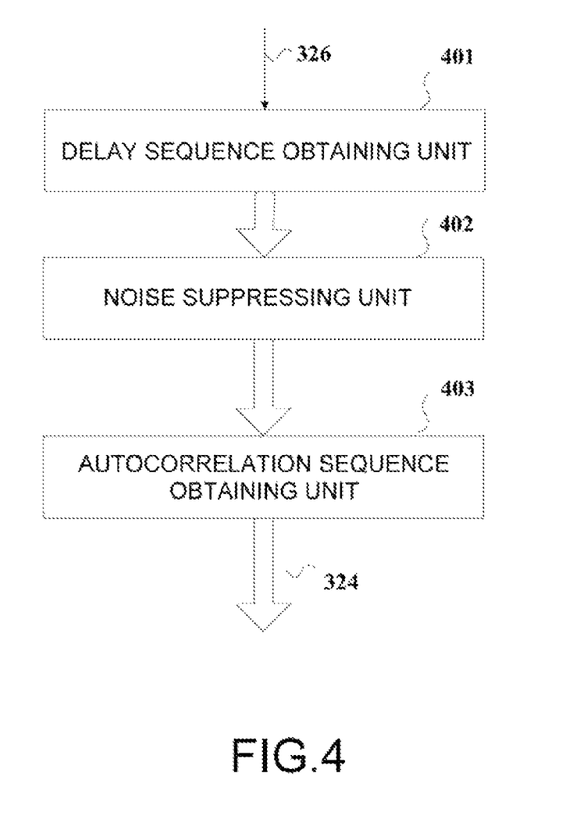
FIG. 4 shows the structure of an autocorrelation calculator according to an embodiment of the present invention.

FIG. 4 schematically shows the structure of the autocorrelation calculator 322 according to an embodiment of the present invention. The autocorrelation calculator 322 according to the embodiment of the present invention can for example refer to the International Patent Application PCT/CN2008/073245, entitled "Phase Noise Statistical Characteristics Monitoring Apparatus and Method, and Coherent Optical Communication Receiver", and filed on Nov. 28, 2008. The entire contents of this international patent application are incorporated herein by reference, as if they were completely enunciated herein.

Specifically, as shown in FIG. 4, the autocorrelation calculator 322 according to the embodiment of the present invention can include a delay sequence obtaining unit 401, a noise suppressing unit 402 and an autocorrelation sequence obtaining unit 403. Input to the delay sequence obtaining unit 401 is the phase offset on each symbol having been removed of data modulation phase, namely the output 326 of the subtracter 321 (see FIG. 3), and the autocorrelation sequence obtaining unit 403 makes use of the output from the noise suppressing unit 402 to determine the autocorrelation and related statistics of the phase offset, namely the output signal 324 of the autocorrelation calculator 322 (see FIG. 3).

The same signal 326 is delayed for different numbers of symbols in the delay sequence obtaining unit 401 to thereby obtain a corresponding delay sequence. The noise suppressing unit 402 performs noise suppression processing on the delay sequence. As should be noted, the noise suppressing unit 402 can be omitted under certain circumstances on the demand of practical application. The noise suppressing unit 402 can include a laser line width influence suppressing unit and an amplifier spontaneous radiation noise influence suppressing unit respectively for suppressing laser line width influence and amplifier spontaneous radiation noise influence.

Referring back to FIG. 3, the filter coefficient determining unit 323 calculates the optimal filter coefficient in accordance with the output signal 324 of the autocorrelation calculator 322, so as to achieve control of the phase recovering apparatus.

Figure 5A:
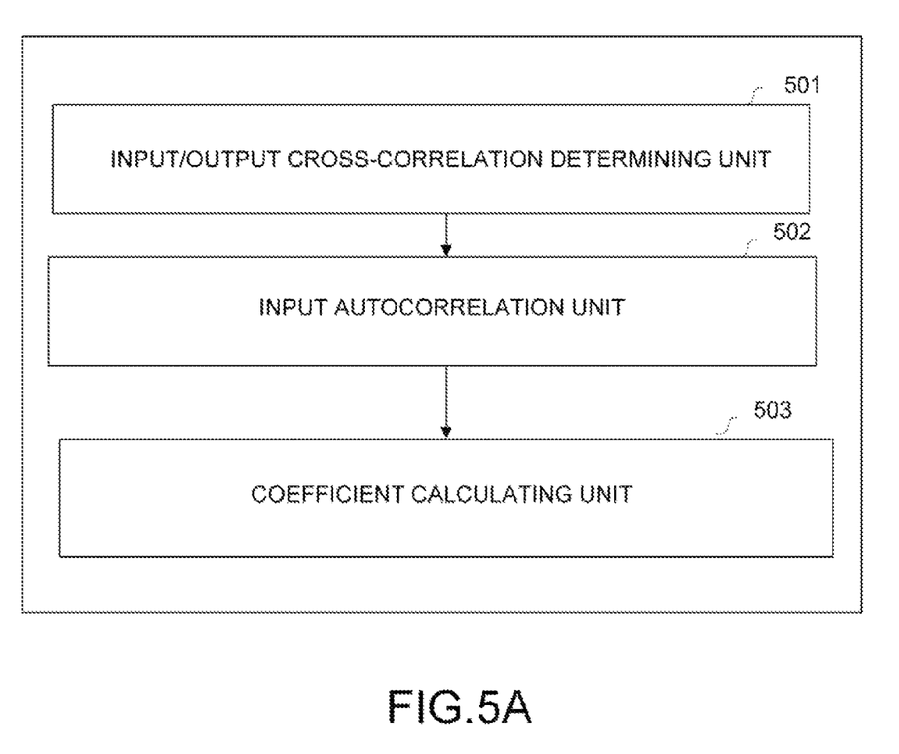
FIG. 5A schematically shows the structure of a filter coefficient determining unit according to an embodiment of the present invention.
Figure 5B:
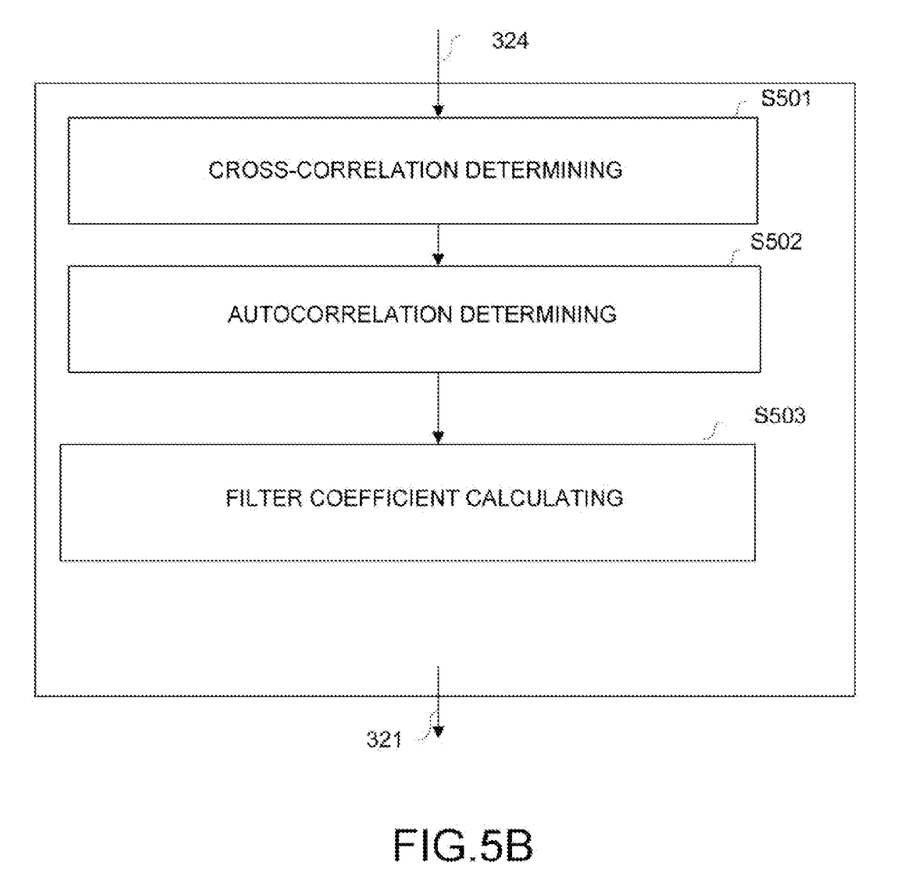
FIG. 5B shows the processing flow of a filter coefficient determining unit according to an embodiment of the present invention.

FIG. 5A schematically shows the structure of the filter coefficient determining unit 323 according to an embodiment of the present invention. FIG. 5B shows the processing flow of the filter coefficient determining unit according to an embodiment of the present invention. The working principle of the filter coefficient determining unit is to design the filter coefficient in accordance with the statistical characteristics of the phase offset and the channel noise, so as to obtain the best compromise between tracking the phase offset and suppressing the noise. As regards a digital filter with the input of $\exp[jM(\phi_0+\phi_n)]$ and with the output of $\exp(jM\hat{\phi}_0)$ (where $\phi_0$ is the phase offset, and $\phi_n$ is the phase fluctuation caused by channel additive white noise; suppose the autocorrelation of $\phi_0$ is $\rho(k)$, the variance is $\sigma_c^2$, and the variance of $\phi_n$ is $\sigma_n^2$), the filter coefficient determined by the filter coefficient determining unit can guarantee that $\hat{\phi}_0$ is the minimum mean square error estimation of the phase offset $\phi_0$.

As shown in FIG. 5A, the filter coefficient determining unit according to the embodiment of the present invention includes an input/output cross-correlation determining unit 501 for determining the cross-correlation between the input and the ideal output of the filter, an input autocorrelation unit 502 for determining autocorrelation of inputs at different timings of the filter, and a coefficient calculating unit 503 for determining the filter coefficient.

FIG. 5B illustrates in detail the processing flow of the filter coefficient determining unit. As shown in FIG. 5B, firstly in step S501, the input/output cross-correlation determining unit 501 calculates the cross-correlation R(k) of the input and output of the optimal filter in accordance with the output 324, namely $\sigma_c^2$ etc., of the autocorrelation calculator 322; R(k) can for example be calculated in accordance with the equation: $R(k)=\exp\{M^2\sigma_c^2[\sigma(k)-1]\}$. Subsequently, the input autocorrelation unit 502 calculates the autocorrelation R'(k) of the input of the optimal filter (step S502); method for calculating R'(k) can for example be $R'(k)=\exp\{M^2\sigma_c^2[\rho(k)-1]\}+M^2\sigma_n^2\delta(k)$, where $\delta(k)$ is an impulse function, and the value of $\delta(k)$ is 1 if the k is 0 and the value of $\delta(k)$ is 0 if k is a value other than 0, where k is an integer and $-M<k<M$. Finally, in step S503, the coefficient calculating unit 503 calculates the coefficient of the optimal filter in accordance with R(k) and R'(k); the calculating method can for example be as follows:

$$\begin{pmatrix} h(1) \\ h(2) \\ \vdots \\ h(2L+1) \end{pmatrix} = \begin{pmatrix} R'(0) & R'(1) & \ldots & R'(2L) \\ R'(1) & R'(0) & \ldots & R'(2L-1) \\ \vdots & \vdots & \vdots & \vdots \\ R'(2L) & R'(2L-1) & \ldots & R'(0) \end{pmatrix}^{-1} \begin{pmatrix} R(L) \\ R(L-1) \\ \vdots \\ R(-L) \end{pmatrix}$$

Where L is an integer, the length of a filter is 2 L+1.

The processing flowchart of the phase recovering apparatus according to the embodiment of the present invention is described below.

Figure 6A:
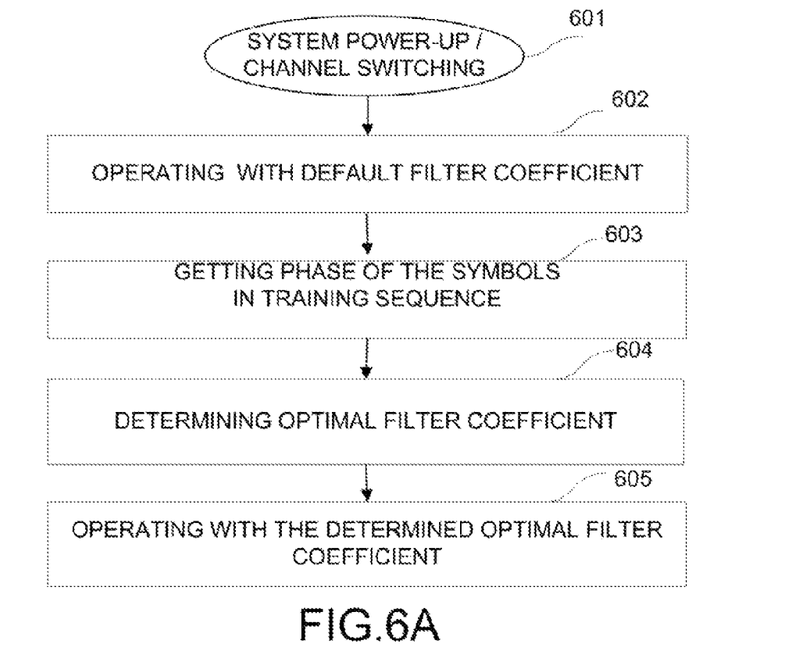
FIG. 6A is a flowchart schematically showing the phase recovering apparatus according to an embodiment of the present invention in the case the receiver has known the data modulation phase of the symbol.

FIG. 6A schematically shows the operational flowchart of the phase recovering apparatus according to the embodiment of the present invention in the case the receiver has known the data modulation phase of the symbol. As shown in FIG. 6A, when the system starts or channels switch (step 601), the phase recovering section of the phase recovering apparatus according to the embodiment of the present invention begins to use a filter by default to operate (step 602), and records during operation the symbol phase of the received training sequence (step 603). Since the data modulation phase of the training sequence has been known to the receiver, the filter coefficient control apparatus 320 can directly obtain the phase offset in accordance with the recorded phase and the known data modulation phase, and determine the optimal filter coefficient in accordance with the phase offset (step 604). Subsequently, the phase recovering apparatus uses the determined optimal filter coefficient to operate (step 605).

Figure 6B:
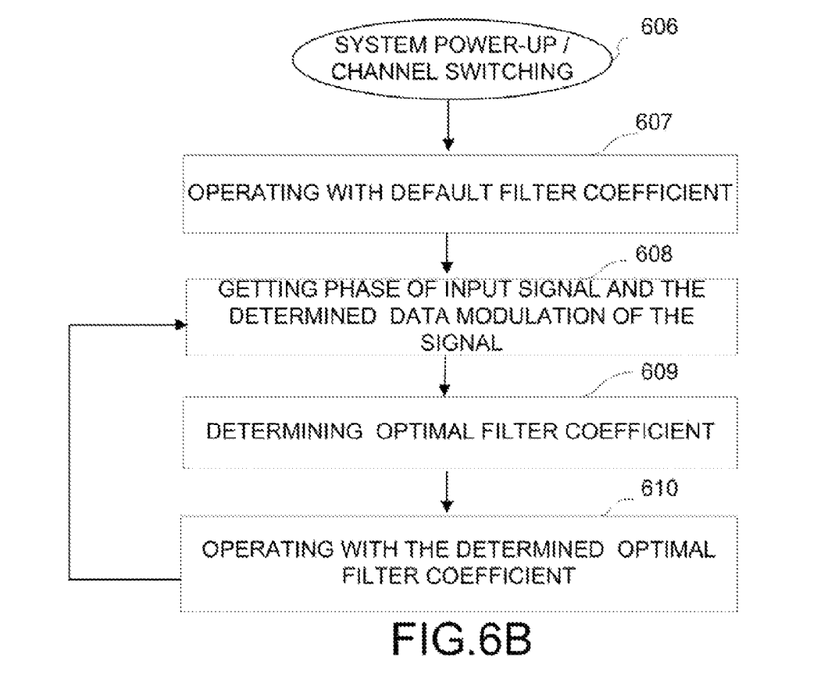
FIG. 6B schematically shows the operational flow of the phase recovering apparatus according to an embodiment of the present invention in the case the receiver does not know the data modulation phase of the symbol.

FIG. 6B schematically shows the operational flow of the phase recovering apparatus according to the embodiment of the present invention in the case the receiver does not know the data modulation phase of the symbol. As shown in FIG. 6B, when the system starts or channels switch (step 606), the phase recovering section of the phase recovering apparatus according to the embodiment of the present invention begins to use a filter by default to operate (step 607), obtains the phase 310 of the input signal and the data modulation phase obtained by performing data deciding on the signal 209, or the data modulation phase obtained from the decoded data output from the final receiver (step 608).

Figure 7:
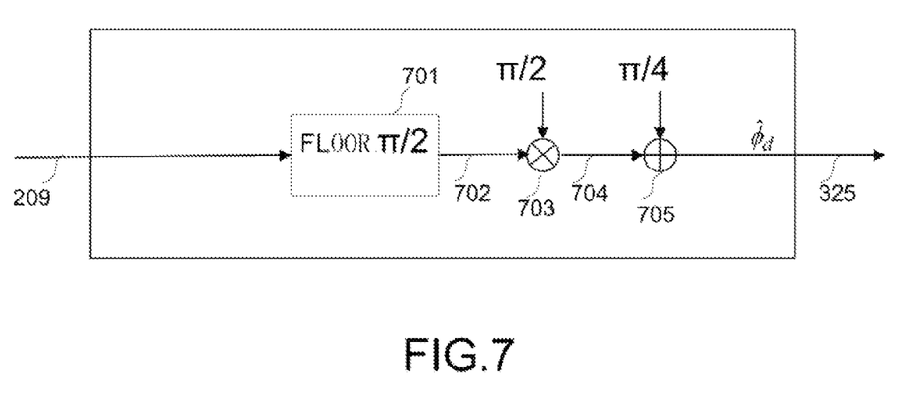
FIG. 7 is a structural block diagram schematically showing the data modulation phase obtaining unit according to an embodiment of the present invention.

FIG. 7 is a structural block diagram schematically showing the data modulation phase obtaining unit 327 according to an embodiment of the present invention. It is explained in this embodiment, taking a QPSK signal for example, as how to obtain the data modulation phase by deciding. As shown in FIG. 7, in this embodiment the output 209 of the phase recovering apparatus passes through the π/2 rounder 701, and the quadrant at which the data modulation phase locates is obtained. For instance, when the data is modulated at a first quadrant, the output from the π/2 rounder 701 is zero, while at a second quadrant, the output from the π/2 rounder 701 is 1; when at a third quadrant, the output from the π/2 rounder 701 is 2, while at a fourth quadrant, the output from the π/2 rounder 701 is 3. Subsequently, the output 702 from the π/2 rounder 701 is multiplied with π/2 at the multiplier 703. Thereafter, the output 704 from the multiplier 703 is added with π/4 at the adder 705 to obtain data modulation phases π/4, 3π/4, 5π/4, or 7π/4 (namely signal 325). As regards the decoded data, it corresponds itself to the output 702 from the π/2 rounder 701, so that it is possible to obtain the data modulation phase of each symbol from the decoded data in the same manner.

As should be noted, description in FIG. 7 takes QSPK for example, when other modulation modes whose order of phase modulation is M are used, the π/2 rounder 701 is correspondingly changed to a 2π/M rounder. The output from the 2π/M rounder is multiplied with 2π/M at the multiplier 703, and the output from the multiplier 703 is added with π/M at the adder 705.

Referring back to FIG. 6B, the optimal filter coefficient is determined in step 609. Subsequently, the phase recovering apparatus uses the determined optimal filter to operate (step 610). Additionally, unlike the circumstance as shown in FIG. 6A, the influence of data judgment error on the working performance of the phase recovering apparatus must be eliminated. Accordingly, in this embodiment of the present invention, after the optimal filter coefficient is determined for the first time (namely after steps 608 through 610), the process of determining the optimal filter coefficient is repeated once (namely steps 608 through 610) to eliminate the influence on the working performance of the phase recovering apparatus of the present invention by the potential great number of judgment errors due to the initial use of the filter by default.

Figure 8:
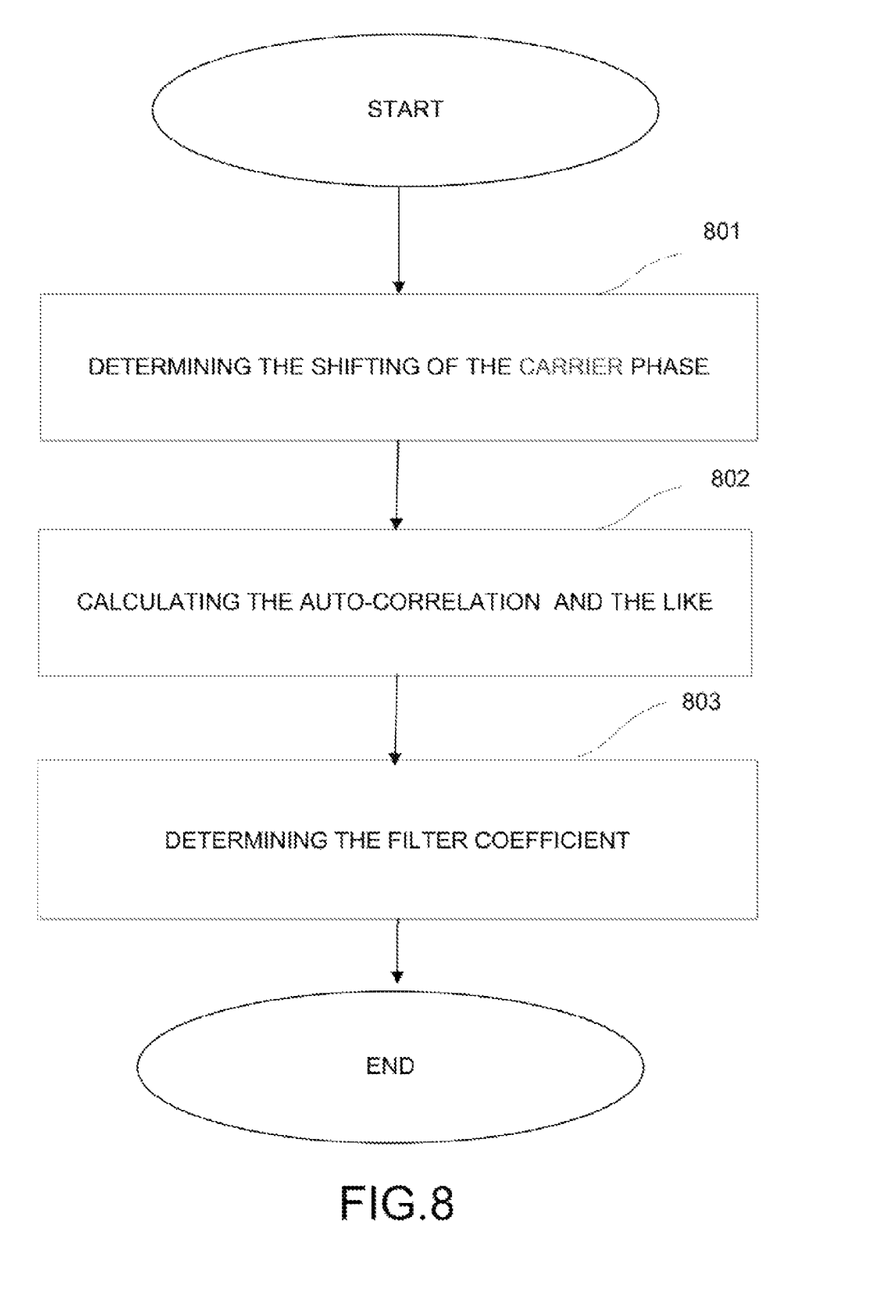
FIG. 8 is a processing flowchart schematically showing the filter coefficient control apparatus 320 according to the present invention.

FIG. 8 shows specific realization of step 604 in FIG. 6A and step 609 in FIG. 6B, namely shows a processing flowchart of the filter coefficient control apparatus 320 according to the present invention.

As shown in FIG. 8, firstly in step 801, offset of the carrier phase is determined, and this is achievable by means of the subtracter. Then in step 802, the autocorrelation determining means determines the autocorrelation of the phase offset and the variance of the phase fluctuation caused by noises. Thereafter in step 803, the filter coefficient determining unit determines the optimal filter coefficient in accordance with the autocorrelation and the variance as determined by the autocorrelation determining means.

Figure 9:
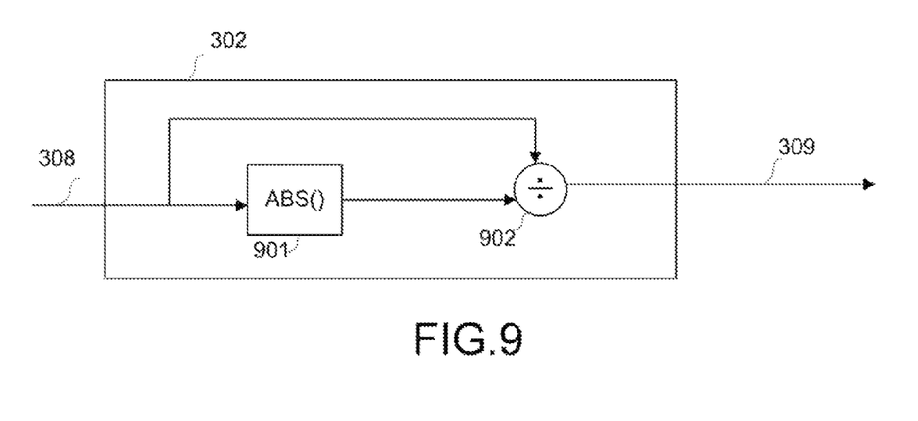
FIG. 9 is a block diagram schematically showing the normalizer in the phase recovering apparatus according to an embodiment of the present invention.

FIG. 9 is a block diagram schematically showing the normalizer in the phase recovering apparatus according to the embodiment of the present invention. As shown in FIG. 3, the input to the normalizer 302 is the complex value 308 of the received signal having been calculated with $M^{th}$ power, and the modulus calculator 901 acquires the modulus of the complex value 308. The complex value 308 is then divided via a divider 902 by the modulus of itself, so as to obtain an output 309 having the same argument as that of each of the input complex value 308 but having a modulus always being 1. As should be pointed out here, the normalizer 302 can enhance the working performance of the adaptive phase recovery according to the embodiment of the present invention, but it is not indispensable. Based on such factors as hardware restrictions, the normalizer can well be omitted from the embodiments of the present invention without affecting the effectiveness of the embodiments of the present invention.

Figure 10:
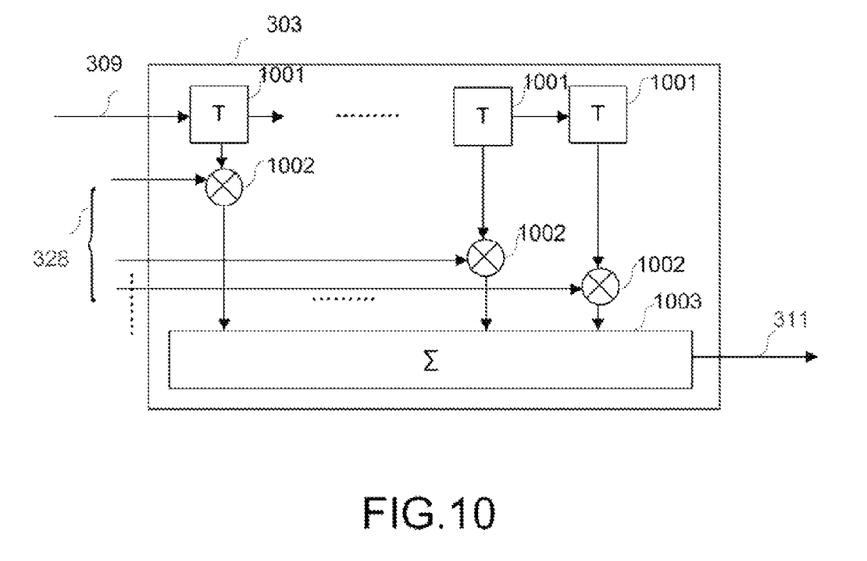
FIG. 10 is a block diagram schematically showing the adjustable filter in the phase recovering apparatus according to the present invention.

FIG. 10 is a block diagram schematically showing the adjustable filter 303 in the phase recovering apparatus according to the embodiment of the present invention. As shown in FIG. 3, the input to the adjustable filter is the output 309 of the normalizer (as previously mentioned, the input can also be the output 308 from the data removal modulator). As shown in FIG. 10, the adjustable filter 303 includes N digital registers 1001 with time delays as one symbol period, N multipliers 1002 (N is the tap number of the filter, and is an integer greater than or equal to 1), and a summator 1003. After being registered by each digital register, the input to the adjustable filter is multiplied with the coefficient 328 of the filter by the multiplier (the coefficient 328 is a vector of 1×N), and the multiplication result is summated by the summator 1003 to obtain the output 311.

Figure 11:
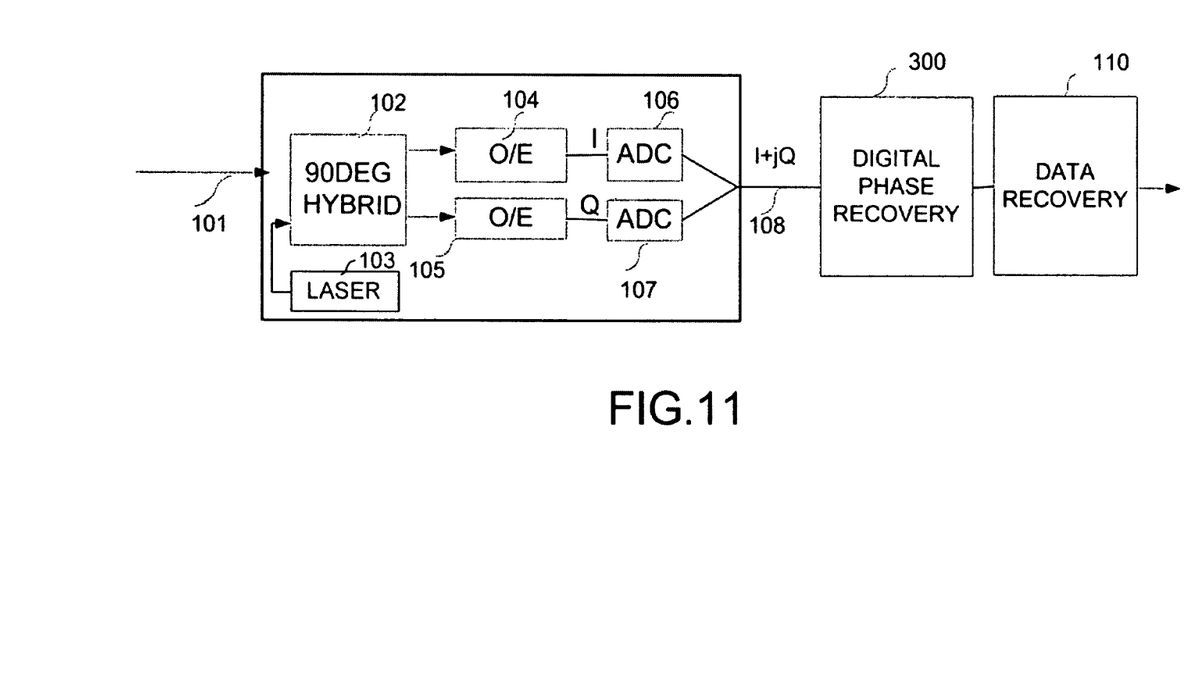
FIG. 11 is a block diagram schematically showing a single-polarization optical coherent receiver that makes use of the phase recovering apparatus according to the present invention.

FIG. 11 is a block diagram schematically showing a single-polarization optical coherent receiver that makes use of the phase recovering apparatus according to the present invention. In comparison with the conventional optical coherent receiver as shown in FIG. 1, the adaptive phase recovering apparatus 300 according to the embodiment of the present invention replaces the phase recovering apparatus 109 in FIG. 11, while other component parts remain intact.

Figure 12:
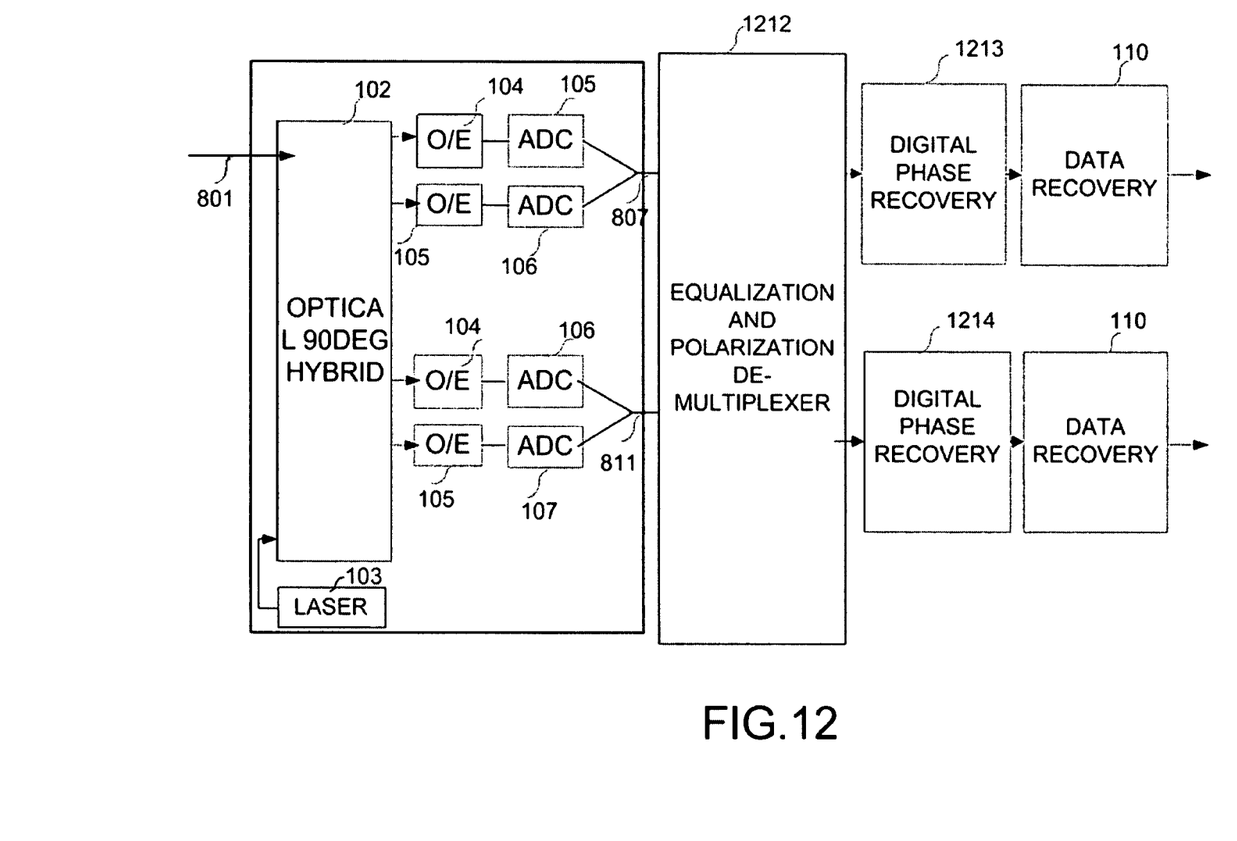
FIG. 12 is a block diagram schematically showing a dual-polarization optical coherent receiver that makes use of the phase recovering apparatus according to the present invention.

FIG. 12 is a block diagram schematically showing a dual-polarization optical coherent receiver that makes use of the phase recovering apparatus according to the embodiment of the present invention. In comparison with FIG. 11, phase recovering apparatuses 1213 and 1214 according to the embodiment of the present invention are respectively used on two polarization branches in FIG. 12. Other sections (including the equalization polarization demultiplexer 1212, etc.) of the dual-polarization optical coherent receiver can be realized according to publicly known technology.

As a person ordinarily skilled in the art is aware, units and steps of the examples described in the embodiments as disclosed in this paper can be realized by electronic hardware, computer software, or combination of the two. To clearly explain the interchangeability of the hardware and the software, configurations and steps of the examples are generally described in the above description according to their functions. Whether these functions are executed by means of the hardware or the software is dependent upon specific applications of the technical solution and restrictive conditions of the design. A person skilled in the art may use different methods for each specific application to realize the functions as described above, and such realizations shall not be regarded as going beyond the scope of the present invention.

Steps of the methods or algorithms described in combination with the embodiments as disclosed in this paper can be realized by hardware, a software module executed by a processor, or a combination of the two. The software module can be placed in a random access memory (RAM), an internal memory, a read-only memory (ROM), an electrically programmable ROM, an electrically erasable and programmable ROM, a register, a hard disc, a mobile magnetic disc, a CD-ROM, or a storage medium of any other form as publicly known in the art.

The embodiments as described above are all exemplary in nature, rather than restrictive to the present invention, as it is possible for a person skilled in the art to conceive of various transformations and modifications based on the principles of the present invention, and all of these transformations and modifications are also covered within the scope of the present invention.

The invention claimed is:

1. A filter coefficient control apparatus, for controlling a coefficient of a filter of a phase recovering apparatus for an optical coherent receiver, comprising:
    a phase offset obtaining means, for obtaining a phase offset between a phase of a symbol received by the optical coherent receiver and a data modulation phase of the symbol;
    an autocorrelation calculating means, for calculating an autocorrelation and related statistics of the phase offset; and
    a filter coefficient determining means, for determining the coefficient of the filter in accordance with the autocorrelation and related statistics,
    wherein the autocorrelation calculating means includes:
    a delay sequence obtaining unit, for obtaining a delay sequence by differently delaying the phase offset; and
    an autocorrelation sequence obtaining unit, for determining the autocorrelation and related statistics of the phase offset in accordance with the delay sequence.

2. The filter coefficient control apparatus according to claim 1, wherein the phase offset obtaining means is a subtracter that subtracts a data modulation phase of each symbol in a training sequence input into the phase recovering apparatus from an argument value of each symbol in the training sequence to obtain the phase offset.

3. The filter coefficient control apparatus according to claim 1, wherein the phase offset obtaining means includes a subtracter and a data modulation phase obtaining unit,
    the data modulation phase obtaining unit obtains a data modulation phase of each symbol of an output signal from the phase recovering means, or obtains a data modulation phase of each symbol in a decoded signal obtained by decoding the output signal; and
    the subtracter subtracts the data modulation phase from an argument value of each symbol in a signal input into the phase recovering means to obtain the phase offset.

4. The filter coefficient control apparatus according to claim 3, wherein the data modulation phase obtaining unit obtains a data modulation phase of each symbol in an output signal from the phase recovering apparatus, and comprises:
    a $2\pi/M$ rounder, for performing $2\pi/M$ rounding on the output signal, where M is an order of phase modulation of the symbol;
    a multiplier, for multiplying an integer value obtained by the $2\pi/M$ rounder with $2\pi/M$; and
    an adder, for adding a product obtained by the multiplier with $\pi/M$.

5. The filter coefficient control apparatus according to claim 1, wherein the filter coefficient determining means includes:
    an input/output cross-correlation determining unit, for determining cross-correlation between an input and an ideal output of the filter in accordance with the autocorrelation and related statistics of the phase offset;
    an input autocorrelation unit, for determining autocorrelation of the input of the filter in accordance with the autocorrelation and related statistics of the phase offset; and
    a coefficient calculating unit, for determining the filter coefficient in accordance with the cross-correlation and the autocorrelation.

6. The filter coefficient control apparatus according to claim 5, wherein the autocorrelation and related statistics is a variance $\sigma_n^2$ of phase fluctuation caused by channel white noise, a variance $\sigma_c^2$ of change of the phase offset, and a normalized autocorrelation $\rho(k)$ of the phase offset;
    the input/output cross-correlation determining unit determines the cross-correlation R(k) between the input and the ideal output of the filter in accordance with the following equation:

$$R(k)=\exp\{M^2\sigma_c^2[\rho(k)-1]\},$$

where M is an order of phase modulation of a symbol of data input into the phase recovering means; and
    the input autocorrelation unit determines the autocorrelation R'(k) of the input of the optimal filter in accordance with the following equation:

$$R'(k)=\exp\{M^2\sigma_c^2[\rho(k)-1]\}+M^2\sigma_n^2\delta(k)$$

where $\delta(k)$ is an impulse function, and the value of $\delta(k)$ is 1 if the k is 0 while the value of $\delta(k)$ is 0 if k is a value other than 0, and where k is an integer and $-M<k<M$.

7. A filter coefficient control apparatus, for controlling a coefficient of a filter of a phase recovering apparatus for an optical coherent receiver, comprising:
    a phase offset obtaining means, for obtaining a phase offset between a phase of a symbol received by the optical coherent receiver and a data modulation phase of the symbol;
    an autocorrelation calculating means, for calculating an autocorrelation and related statistics of the phase offset; and
    a filter coefficient determining means, for determining the coefficient of the filter in accordance with the autocorrelation and related statistics,
    wherein the autocorrelation calculating means includes:
    a delay sequence obtaining unit, for obtaining a delay sequence by differently delaying the phase offset;
    a noise suppressing unit, for suppressing noise in the delay sequence; and an autocorrelation sequence obtaining unit, for determining the autocorrelation and related statistics of the phase offset in accordance with the delay sequence having been suppressed of noise.

8. A method for controlling a filter coefficient, for controlling a coefficient of a filter of a phase recovering apparatus for an optical coherent receiver, comprising:
   obtaining a phase offset between a phase of a symbol received by the optical coherent receiver and a data modulation phase of the symbol;
   calculating an autocorrelation and related statistics of the phase offset; and
   determining the coefficient of the filter in accordance with the autocorrelation and related statistics,
   wherein the calculating comprises:
      obtaining a delay sequence by differently delaying the phase offset; and
      determining the autocorrelation and related statistics of the phase offset in accordance with the delay sequence.

9. The method for controlling a filter coefficient according to claim 8, wherein the obtaining subtracts a data modulation phase of each symbol in a training sequence input into the phase recovering apparatus from an argument value of each symbol in the training sequence to obtain the phase offset.

* * * * *